US012083076B2

(12) United States Patent
Krance

(10) Patent No.: US 12,083,076 B2
(45) Date of Patent: Sep. 10, 2024

(54) MEDICATION DOSE TIMING DEVICE

(71) Applicant: Andrew Michael Krance, Wesley Chapel, FL (US)

(72) Inventor: Andrew Michael Krance, Wesley Chapel, FL (US)

( * ) Notice: Subject to any disclaimer, the term of this patent is extended or adjusted under 35 U.S.C. 154(b) by 0 days.

(21) Appl. No.: 18/517,299

(22) Filed: Nov. 22, 2023

(65) Prior Publication Data

US 2024/0164992 A1 May 23, 2024

Related U.S. Application Data

(60) Provisional application No. 63/409,644, filed on Sep. 23, 2022.

(51) Int. Cl.
*A61J 7/04* (2006.01)

(52) U.S. Cl.
CPC .......................... *A61J 7/04* (2013.01)

(58) Field of Classification Search
CPC .......... A61J 7/04; A61J 7/0409; A61J 7/0481; A61J 7/0472; A61J 1/03; A61J 1/1412; A61J 1/1418; A61J 1/142
See application file for complete search history.

(56) References Cited

U.S. PATENT DOCUMENTS 398,012 A * 2/1889 Weaver .................. A61J 7/04 116/308
2,111,637 A * 3/1938 Mehaffey .................. A61J 7/04 215/230
2,587,147 A * 2/1952 Guion .................. A61J 7/04 116/308
3,921,568 A * 11/1975 Fish .................. G07C 1/00 215/230
4,011,829 A * 3/1977 Wachsmann .................. B65D 50/046 206/534
4,347,804 A 9/1982 Villa-Real
4,528,933 A * 7/1985 Allen .................. A61J 7/04 215/230
4,802,438 A * 2/1989 DeJonge .................. A61J 7/04 206/534
5,009,338 A * 4/1991 Barker .................. G06M 1/248 215/230
5,261,548 A * 11/1993 Barker .................. B65D 55/022 215/218
5,279,422 A * 1/1994 Adams .................. A61J 7/04 215/230
5,358,117 A 10/1994 Adams
5,577,335 A 11/1996 Tucker
5,694,882 A * 12/1997 Marshall .................. B65D 51/245 116/319
5,720,392 A 2/1998 Price
7,658,162 B2 * 2/2010 Kreshek .................. G09F 11/23 206/534
8,763,553 B1 7/2014 Shannehan et al.

(Continued)

*Primary Examiner* — Mollie Impink
(74) *Attorney, Agent, or Firm* — Dunlap Bennett & Ludwig, PLLC

(57) ABSTRACT

A medical dose timing device takes the form of a replacement cap for prescription bottles. A top face of the cap contains a twelve-hour clock face. An hour pointer is made to rotate manually only in one direction via stops at each hour. Each stop comprises a ramp for the free-rotating direction, and a flat face to prevent pointer rotation backwards in the counterclockwise direction.

6 Claims, 2 Drawing Sheets

(56) References Cited

U.S. PATENT DOCUMENTS

| | | | | |
|---|---|---|---|---|
| 8,857,617 | B2 * | 10/2014 | Balakier ................ | B65D 41/06 206/540 |
| 9,021,981 | B2 * | 5/2015 | Raiti De Boyles ....... | A61J 7/04 116/315 |
| 9,775,779 | B2 * | 10/2017 | Ali ........................ | A61J 1/1412 |
| 10,213,365 | B1 | 2/2019 | Sukkarieh | |
| D966,697 | S | 10/2022 | Chen | |
| 2003/0222045 | A1 * | 12/2003 | Shane ....................... | A61J 7/04 215/230 |
| 2007/0056503 | A1 | 3/2007 | Sollaccio | |
| 2023/0329976 | A1 | 10/2023 | Yarto | |

* cited by examiner

MEDICATION DOSE TIMING DEVICE

CROSS-REFERENCE TO RELATED APPLICATION

This application claims the benefit of priority of U.S. provisional application No. 63/409,644, filed Sep. 23, 2022, the contents of which are herein incorporated by reference.

BACKGROUND OF THE INVENTION

The present invention relates to medical pill tracking devices and, more particularly, to a medication dose timing notification device.

Pills and self-administered medication are a cornerstone of modern medicine. Doctors often prescribe such pills and medication with instructions for patients to self-administer these pills and medication at regular intervals, e.g., every 6 hours. However, it is often the case that patients forget when they took the last pill or bit of medication, leading to confusion as to when they must take their next dose of pills or medication. This can lead to potentially dangerous situations where patients take too little medication, which can lead to the issue the medicine is meant to resolve becoming worse, or too much medication, which in some instances can lead to life threatening overdoses of medication.

Some devices have been created in an attempt to solve this issue of keeping patients taking their medication at the prescribed regular intervals. These conventional devices however often simply bundle or separate pills for a given dose without providing any indication as to when the patient should be taking that dose. Alternatively, they may allow selection of a future pill taking time, but without structures to guide accurate selection of that time.

Concerning accurate selection, many people taking pills have arthritis or degenerative nerve or muscle conditions (e.g., Parkinsons) that cause twitching or spasms in the hand. Heretofore, no device has allowed selection of a pill time, with accommodations for persons so afflicted to make that selection with minimal worry of a spasm, twitch or general pain interfering with the manual action that is needed.

U.S. Pat. No. D966,697 generally shows a medication case where pills are bundled into separate compartments, one for each day of the week.

U.S. Published Patent App. 2023/0329976 generally shows a dosage tracking apparatus with windowed dials, where the apparatus is affixed with a strap to the cylinder of a conventional pill bottle.

U.S. Pat. No. 5,577,335 discloses a numbered movable dial on imprinted indicia of time, intended to be attached via adhesive to the existing cap of a pill bottle.

U.S. Pat. No. 8,763,553 discloses another movable dial with a window that rotatably passes over numbers indicating time of day, this one in the form of a pill bottle cap itself.

Pill bottle replacement caps are also shown in U.S. Pat. No. 10,213,365 (single movable pointer-dial to point to days of the week and two places in between) and U.S. Published Patent App. No. 2007/0056503 (clockface style with short and long pointer hands, freely rotatable forward and back).

As can be seen, there is a need for a device that helps patients track the times at which they should take medications. The present state of the art lacks structures to guide the operator accurately, without overconcern about inaccurate manual selection. The present invention solves these issues by providing a medication dose timing notification device.

SUMMARY OF THE INVENTION

In one aspect of the present invention, a medical dose timing device comprises a clockface style dial built into a replacement cap for a conventional pill bottle. The clockface comprises arcuate stops that, in one rotational direction permits sliding of a clock hand, but in the other rotational direction prohibits such sliding.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

As stated herein, the medical dose timing device of the present invention solves the confusion as to when a person should take their next pill. In operation, once a pill is taken, the person sets the dial, manually, to the next appropriate hour for when that next pill is to be taken as per the prescription. In this way, the medical dose timing device will indicate an individual time for each prescribed medication, and will, when used per directions, clearly indicate to the person what time they should take the next pill.

Unlike prior art devices, the medical dose timing device of the present invention contains structures to guarantee accurate placement of the next dosage time. In particular, the device (in the form of a replacement cap) comprises a number of stops along the dial, twelve in the embodiments depicted herein, each positioned to place the hour pointer just at the selected hour without ability to move backwards. The stops do so by comprising angled-ramp projection notches (e.g., triangular polygons) with the angle side impinging upon the rotating dial when moving in the clockwise direction; while simultaneously comprising flat faces with respect to the counterclockwise direction; thus preventing rotation backwards during pointer movement.

Figure 1:
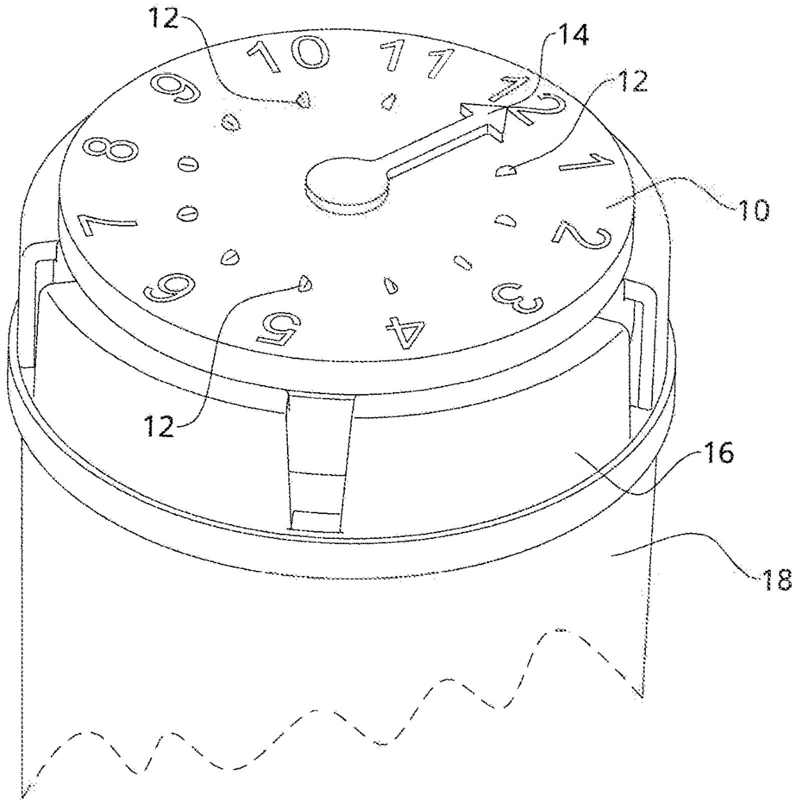
FIG. 1 is a perspective view of an embodiment of a medication does timing notification device in accordance with the present invention.
Figure 2:
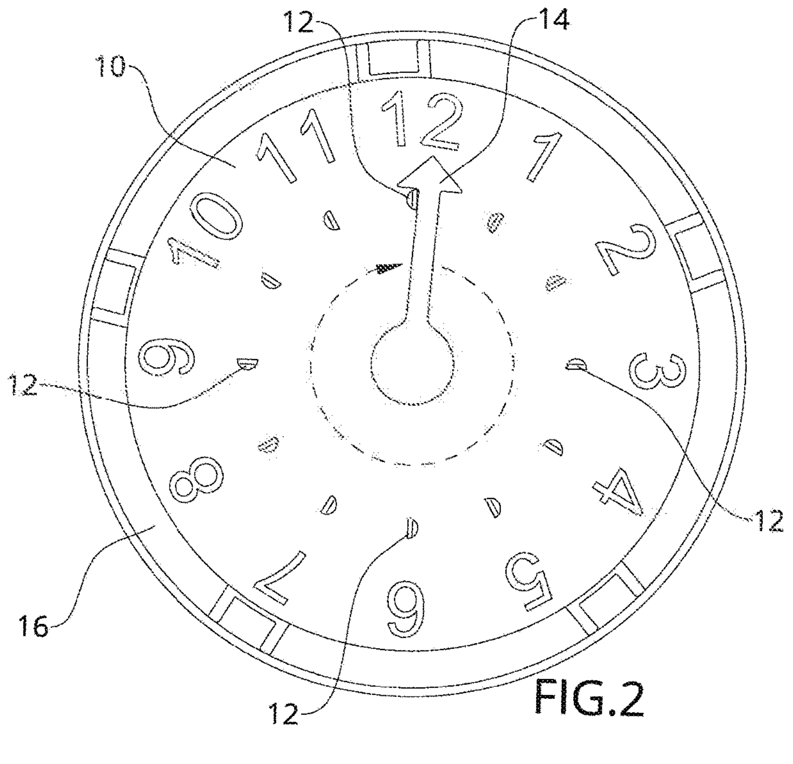
FIG. 2 is a top view thereof.
Figure 3:
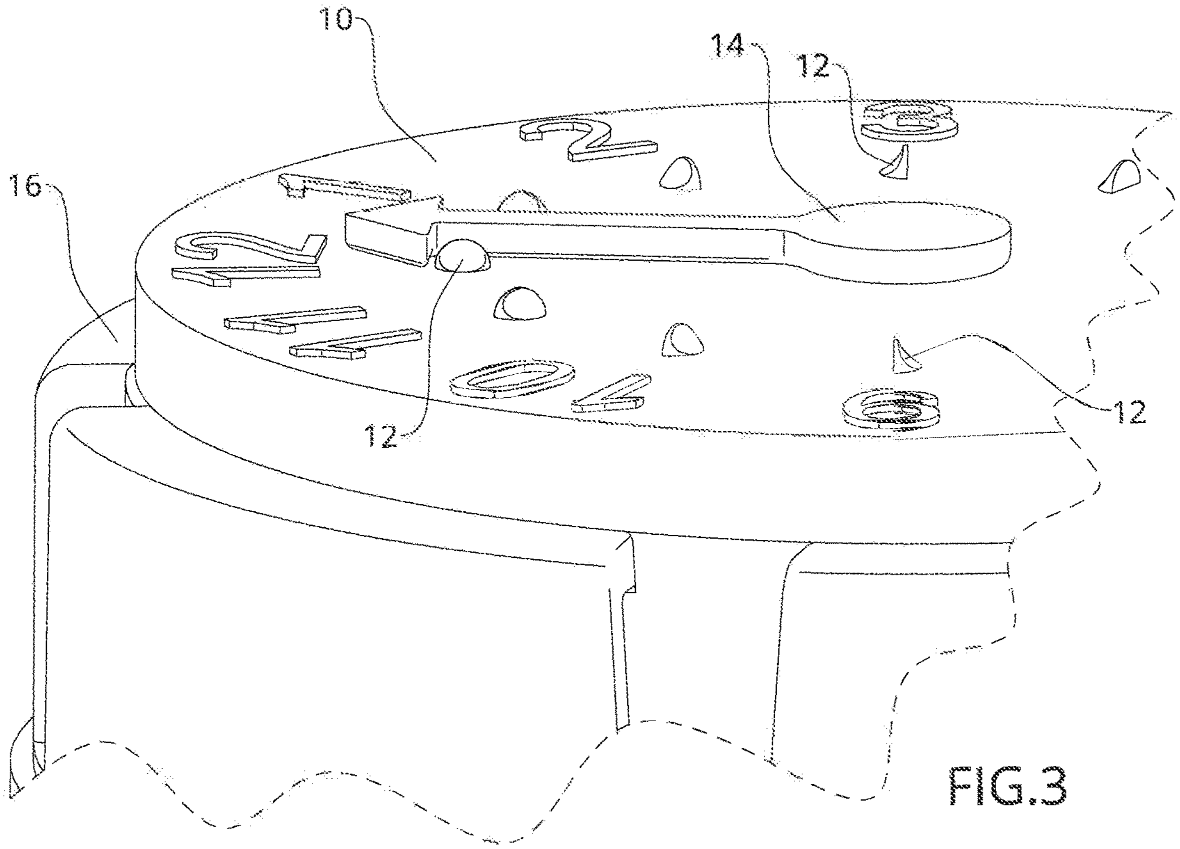
FIG. 3 is a close-up side perspective view thereof.

As shown in FIGS. 1 through 3, the medical dose timing device generally comprises a replacement cap 16 intended to fit onto conventional pill bottle 18. Top surface 10 of the replacement cap 16 comprises a clock face. It should be understood that while a twelve-hour clock is depicted, any form of clock face may suffice, including twenty-four-hour clocks, or day of the week indications, the latter preferably comprising at least morning, evening and afternoon subdivision demarcations.

Pointer 14 is rotatably but permanently fixed to top surface 10, by an known means of fixture at the base of its arrow. For example, the vertical axis of rotation (not shown) may, during manufacture, be irreversibly snapped into a hole at the center of the clock face. Replacement cap 16 will take the place of the preexisting cap that originally came with the prescription. In this way, a replacement cap on a conventional prescription plastic bottle becomes converted to a time-indicating cap with a clock-like face on it, indicating twelve distinct hours. Pointer 14 acts as an hour hand (an arrow, which when moved).

As mentioned, a number of stops 12 exist along the dial of top surface 10. Each stop 12 is positioned to place pointer 14 just at the selected time indication (e.g. hour) without the ability to rotate backwards. Thus stops 12 cause rotating pointer 14 essentially to act as a one-way clockwise rotating pointer. Stops 12 each comprise angled-ramp projection notches (e.g., triangular polygons) with the angle side impinging upon the rotating dial when moving in the clockwise direction; while simultaneously comprising flat faces with respect to the counterclockwise direction; thus preventing rotation backwards during pointer movement. The chosen time indication will therefore lightly lock and stay in the newly designated hour for the next pill time.

It will be appreciated that the medical dose timing device of the present embodiment uses the sizes and measurements of existing prescription pill plastic containers with the addition of the clock image now printed onto (or built into) a top face, and a moving arm (coupled with a manually movable hand which the person taking the pill will adjust for the next pill time). While embodiments so far herein have been described as a full replacement cap for end consumer use, other embodiments may work identically in an OEM or retailer/distributor environment. In particular, embodiments of the present invention can take the form of adhesive disk systems containing only the top surface 10 with the mechanisms as herein described. As such, they can be attached to existing pill vial tops in any manufacturing assembly line (or distribution environment such as pharmacies) by any known permanent adhesive.

In use by an end consumer, where (for example) a person has multiple different medications in need of taking at different designated time intervals, the user will usually keep medications together in one place. As that person takes a pill, assuming the next one needs to be taken six hours later, he or she will move the hand on the clock six hours ahead. Stops 12 prevent back-rotation during this action, even if the person's hand twitches or spasms. This will indicate when to take that next pill. This same procedure will take place with the remaining four pill bottles as well.

Embodiments may manufactured as a full replacement cap, or alternatively be printed as disk mechanisms separately from the container cap proper, and then attached to each container cap.

It should be understood, of course, that the foregoing relates to exemplary embodiments of the invention and that modifications may be made without departing from the spirit and scope of the invention as set forth in the following claims.

What is claimed is:

1. A medical dose timing device comprising:

a cap sized to fit onto and seal a conventional prescription bottle, the cap comprising a top;

wherein the top is covered by an applied adhesive disk, the disk comprising a clock face top into which is fixed a rotating pointer, the rotating pointer having a base and an arrow tip, the base fixed into the center of the clock face top through a vertical axis, the vertical axis enabling rotation of the rotating pointer;

the clock face top of the applied adhesive disk further comprising a plurality of time indications at an outer edge of the clock face top to which the arrow tip may point, and a plurality of upward projecting stops, each stop permitting rotation of the rotating pointer in a first direction and preventing rotation in a second direction, whereby a person with unstable hands from twitches or spasms may program a next pill time through rotational movement of the arrow tip without effect from hand twitches or spasms that might otherwise create an erroneous next pill time display.

2. The device of claim 1, wherein the clock face top comprises twelve time indications of a twelve-hour clock.

3. The device of claim 1, wherein the clock face top comprises one stop for each time indication, and each such stop is aligned to stop the pointer at its respective time indication.

4. The device of claim 1, wherein the clock face top comprises twelve stops, and such stop is aligned to stop the rotating pointer at its respective one of the twelve time indications.

5. The device of claim 1, wherein each of the plurality of stops comprises an angled ramp that engages and lets pass the rotating pointer in the first direction, and a flat face that engages and stops from passing the rotating pointer in the second direction.

6. The device of claim 5, wherein each of the plurality of stops comprises a triangular polygon.

* * * * *